Feb. 14, 1950      R. R. ROBERTS      2,497,690
WORK DRIVING MECHANISM FOR LATHES

Filed July 1, 1948      3 Sheets-Sheet 1

INVENTOR.
ROLAND R. ROBERTS
BY
ATTORNEY

Feb. 14, 1950 — R. R. ROBERTS — 2,497,690
WORK DRIVING MECHANISM FOR LATHES
Filed July 1, 1948 — 3 Sheets-Sheet 3

INVENTOR.
ROLAND R. ROBERTS
BY
ATTORNEY

Patented Feb. 14, 1950

2,497,690

UNITED STATES PATENT OFFICE 2,497,690

WORK DRIVING MECHANISM FOR LATHES

Roland R. Roberts, Irondequoit, N. Y., assignor to Consolidated Machine Tool Corporation, Rochester, N. Y., a corporation of Delaware Application July 1, 1948, Serial No. 36,505

4 Claims. (Cl. 82—40)

The present invention relates to drivers for lathes and in particular to drivers for car wheel lathes.

In a car wheel lathe, the nature of the work is ordinarily such as to preclude the work being gripped between chuck jaws carried by a single face plate. Where the work is a pair of wheels solid with their axle, for instance, and it is desired to apply cuts to the rims of the wheels, the work must be mounted between the centers of the lathe and made to rotate with the face plates of the lathe by drivers, which are carried by the face plates and which engage the outsides only of the wheels.

A lathe driver was known and used many years ago which comprised a pivoted arm that had rockable blocks at opposite ends thereof which had serrated surfaces to engage the outside surface of a car wheel, and which was so constructed that the engaging surface of one of the blocks was eccentric of its rocking center so that resistance of the work to rotation under the cutting tool caused the eccentric block to swing the arm in such direction that the other block would bite more firmly into the work. Thus, the greater the cutting pressure, the more securely did the driver grip the work.

For a car wheel axle, a plurality of drivers must be employed on each face plate of the lathe to secure balanced driving action. While the type of driver described had a very positive gripping action, it fell into disuse because of the time consumed by the operator in individually adjusting the plurality of drivers required so that all would have driving engagement with the axle mounted between the face plates.

More recently driving dogs have been used on car wheel lathes which have serrated gripping faces, which have an axial rectilinear movement to and from gripping position, and which are held in gripping position under hydraulic pressure.

The primary object of the present invention is to provide an improved driver for car wheel lathes which will permit of utilizing the excellent gripping action of the pivoted type driver first described while allowing the plurality of drivers, which are required to drive the work from a face plate, to be moved simultaneously into or from gripping engagement with the work without any special effort of the operator.

Another object of the invention is to provide a driving mechanism in which a plurality of drivers are mounted on a face plate to engage the work in equi-spaced relation, in which each driver comprises a pivoted arm and a pair of rockable blocks that have serrated work-engaging surfaces, one of which is eccentric of its rocking center, and in which the eccentric blocks of the several drivers are simultaneously moved into or from gripping engagement with the work by fluid pressure under control of a single valve.

A further object of the invention is to provide a driving mechanism of the character just described in which the movement of the eccentric driving blocks to and from gripping position is effected by pneumatic pressure, and in which auxiliary means is provided to maintain the eccentric driving blocks in gripping engagement with the work during turning or facing, and said auxiliary means is activated or released simultaneously with activation or release of the drivers.

Other objects of the invention will be apparent hereinafter from the specification and from the recital of the appended claims.

Figure 1:
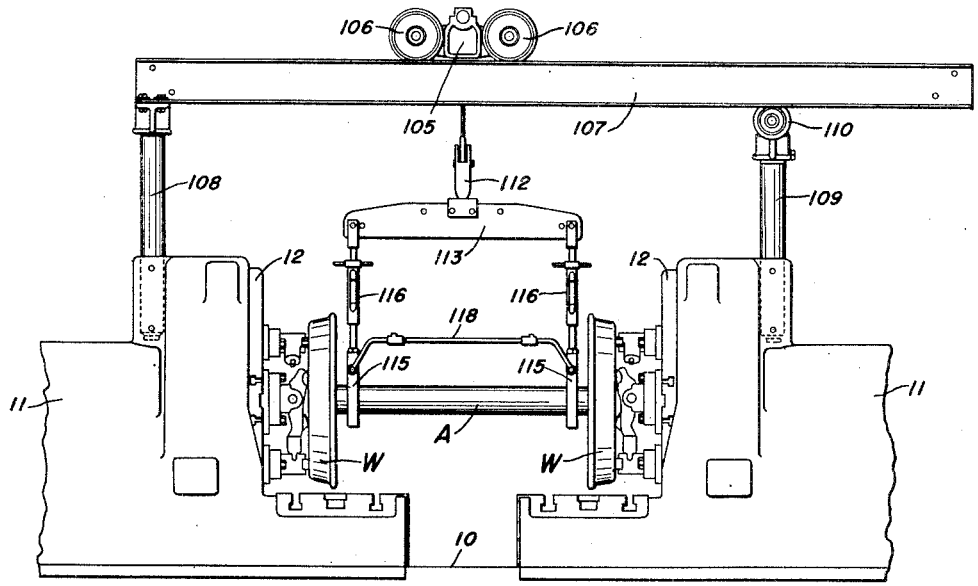
Fig. 1 is a fragmentary side elevation of a car wheel lathe showing the work suspended therein and showing two sets of drivers built according to the present invention in position to engage the outside surfaces of the wheels of the work.

Referring now to the drawings, 10 denotes the bed of the lathe; and 11 are its heads. One or both of these heads is adjustable on ways on the bed 10 to move them toward or from the work. Journaled in the two heads are the spindles (not shown) which carry the centers (not shown), between which the work is mounted, and the face plates 12 on which the drivers are secured. The face plates are coaxial with the spindles and secured thereto to rotate therewith.

Figure 2:
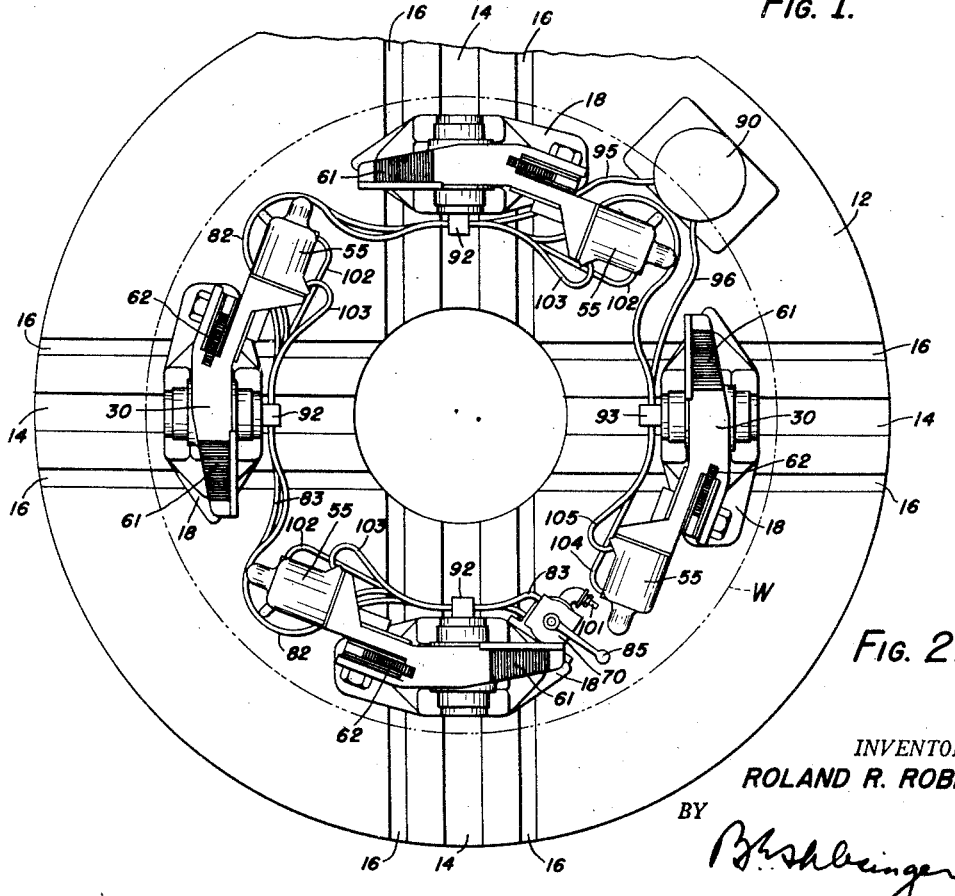
Fig. 2 is a front elevation of one of the face plates of the lathe on an enlarged scale showing the set of drivers associated with that face plate and how the drivers are connected together.

One of the face plates is shown on an enlarged scale in Fig. 2. It is provided with four equiangularly spaced radial ways 14; and at each side of each way 14 it is formed with a T-slot 16 that extends parallel to the associated way 14.

All this is conventional car wheel lathe structure and need not further be described.

Figure 4:
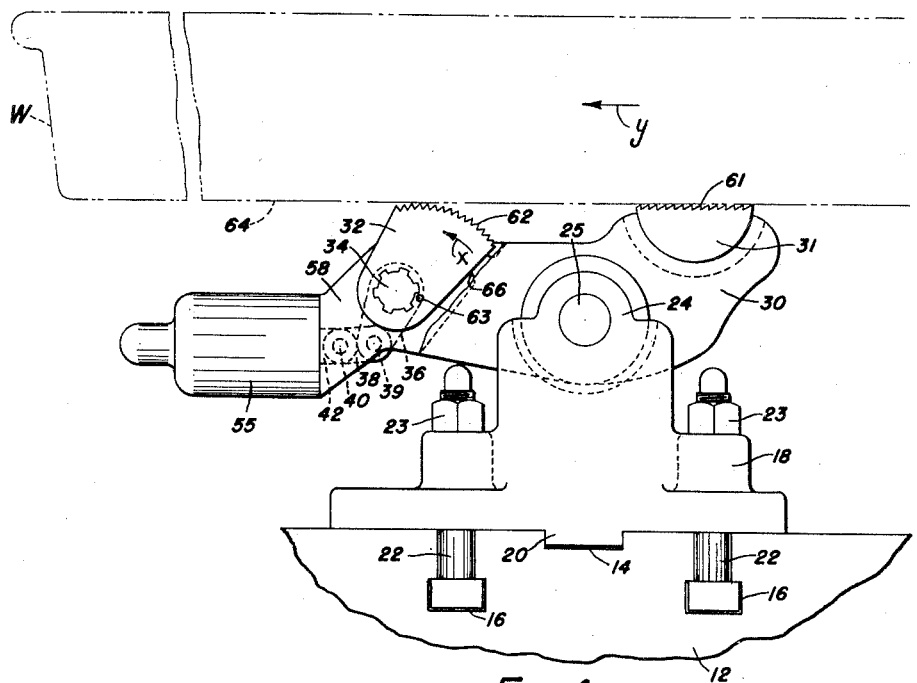
Fig. 4 is a side elevation of the driver, showing also fragmentarily its mounting and in dotted lines the car wheel which it grips.

Mounted on each face plate are the bases or stands 18 that carry the drivers of the present invention. Each base or stand 18 has a tongue 20 (Fig. 4) formed on its underface that engages in a way 14 of the face plate; and the bases 18 are adjustable radially of the axis of the face plate to suit the diameter of the work which is to be operated upon by the lathe. Each base or stand 18 is adapted to be secured in any adjusted position by T-bolts 22 which engage in the T-slots 16. Nuts 23 cooperate with the T-bolts.

Each base 18 is provided with ears 24 and between the ears of each base is pivotally mounted by means of a stud 25 a lever arm 30. One end of the lever is provided with an arcuate socket in which is seated a rocker block 31. This rocker block may have an arcuate dovetailed projection that engages in a corresponding dovetailed recess in the socket, or the block may be secured in any other suitable manner in the socket. The opposite end of each lever 30 is inclined slightly laterally to the body portion of the lever and is furcated and between its furcations is pivotally mounted a block 32. The slight bend in the lever allows the block 32 to extend in the general direction of rotation of the face plate.

The block 32 has a splined connection with a pivot bolt 34 which is journaled in the furcations of the lever and is secured therein by nut 35. Secured to the head of pivot bolt 34 is an arm 36. This arm is furcated at its free end and has a link 38 mounted between its furcations by means of a pin 39. The link 38 is connected by means of a pin 40 with the furcated outer end of a piston rod 42.

The piston rod 42 is secured by means of a nut 44 to a piston which is designated as a whole at 45. The piston may comprise a center plate 46, packings 47 and 48 and end plates 49 and 50. End plate 49 seats against a shoulder on piston rod 42 and nut 44 threads against plate 50.

The piston 45 is reciprocable in a cylinder 55 which is secured by bolts or in any other suitable manner to a packing gland or head 56 and to a lateral extension 58 of one of the furcations of lever 30. The rear end of the piston rod 42 engages in a guide hole 59 in cylinder 55 so that it is supported firmly during reciprocation of the piston.

The outer surfaces of the blocks 31 and 32 are serrated as denoted at 61 and 62, respectively, to engage a side surface of the work, here shown as a car wheel W. The outer surface of block 32 is, moreover, eccentric of pivot bolt 34. The center 63 of this eccentric surface is so located that if the block 32 be swung in the direction of the arrow $x$, keeping its serrated surface 62 in contact with the outside surface 64 of the car wheel W, the axis of bolt 34 will be moved outwardly away from the work, carrying the corresponding end of the lever 30 with it. This causes the other end of lever 30 to move inwardly and causes block 31 to rockably adjust itself. If a driver be applied to a face 64 of the work, then, with one edge of block 32 contacting seat 66, that is formed between the furcations of lever 30, and the face plate, on which the driver is mounted, be rotated to revolve the work under a cutting tool, resistance of the work to rotation sufficient to cause slippage on serrated face 61 of block 31 will cause the work to move in the direction of the arrow $y$ relative to the driver, causing block 32 to move in direction $x$ and at the same time, as described above, causing block 31 to adjust in its socket and bite more firmly into the work. The axes of movement of blocks 31 and 32 extend in the same general direction as the axis of the lever 30 on which the blocks are mounted, and the axis of the lever is perpendicular to the axis of the face plate.

Figure 3:
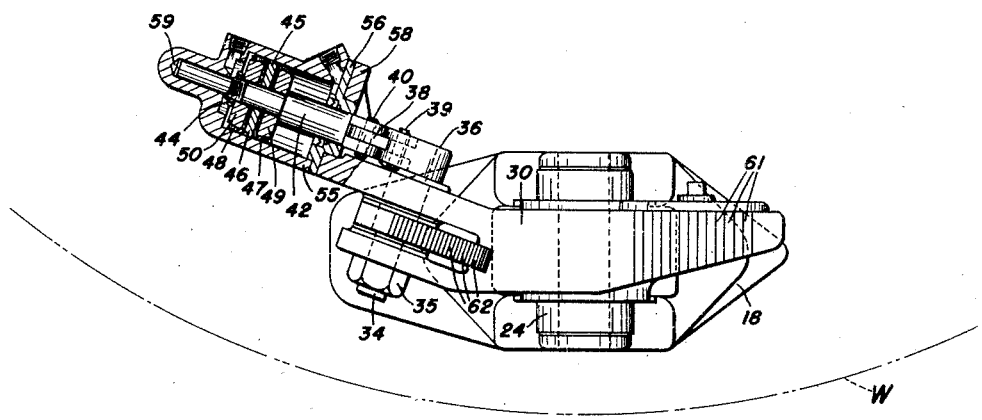
Fig. 3 is a front elevation of one of the drivers on a still further enlarged scale.
Figure 5:
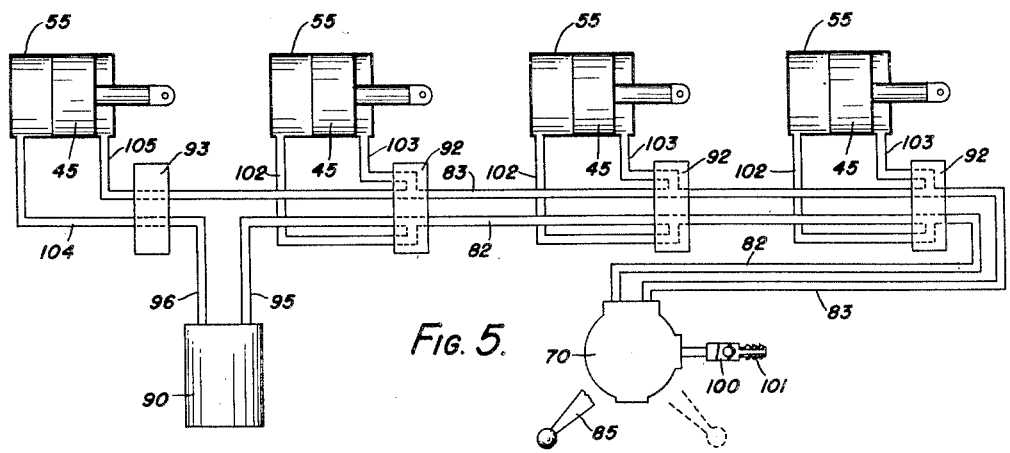
Fig. 5 is a diagrammatic view of the fluid pressure system for operatively connecting the several drivers of a set.

To move block 32 of one of the drivers into gripping engagement with the work, fluid pressure is applied to the left hand end (Figs. 3 and 4) of the piston 45. There are a plurality of drivers attached to each face plate, four in the instance shown. To move the blocks 32 of the whole set of drivers, which are carried by a face plate, simultaneously into engagement with the work, the several cylinders 55 associated with the different drivers may be connected to one another in parallel as shown diagrammatically in Fig. 5. The engagement or release of all the cylinders of a face plate may then be effected simultaneously under control of a single control valve. This valve may be of standard or any suitable construction.

Figure 6:
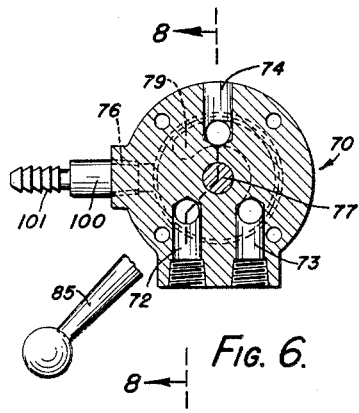
Fig. 6 is a transverse sectional view of one type of control valve that may be used with this system, and showing the valve in one of its positions.
Figure 8:
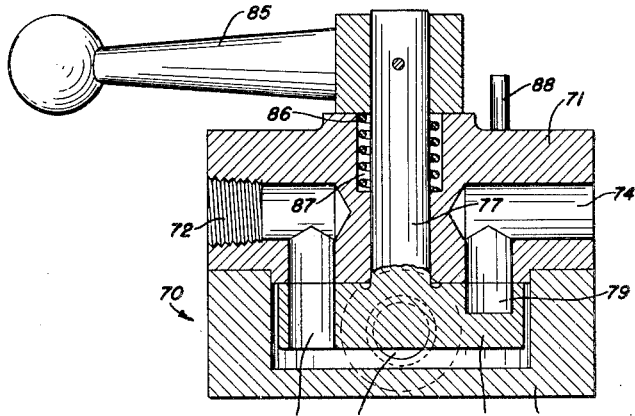
Fig. 8 is a section through the valve on a somewhat enlarged scale taken on the line 8—8 of Fig. 6.
Figure 7:
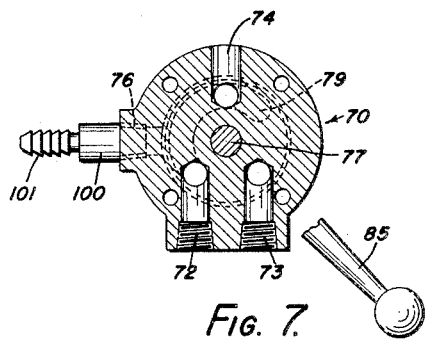
Fig. 7 is a corresponding view showing the valve in another position.

One form of suitable control valve is shown in Figs. 6 to 8 inclusive, where it is designated as a whole at 70. This valve comprises a body portion 71 which has three right angular ducts 72, 73 and 74 formed therein. Ducts 72 and 73 connect with piping 82 and 83, respectively, that lead to opposite sides of the cylinders 55. Duct 74 is the exhaust outlet. Secured to the body portion 71 of the valve is a base 75. This base is drilled to provide an inlet duct 76. Rotatably mounted in body portion 71 is a valve stem 77 with which is integral valve head 78. Valve head 78 has an arcuate recess 79 formed in its upper face and extending about 180° about the axis of the valve stem. It also has a hole or duct 80 extending through it and spaced equidistantly from the two ends of recess 79.

In the position of valve shown in Figs. 6 and 8, the motive fluid can pass from inlet 76 through hole 80 and duct 72 into line 82 while line 83 will communicate through duct 73 and recess 79 with duct 74. When the valve is rotated to the position shown in Fig. 7, the line 83 is put on supply from inlet duct 76 through hole 80 and duct 73, while line 82 is put on exhaust through recess 79 and outlet 74.

Valve 70 may be operated by a lever or handle 85 which is pinned to valve stem 77. A coil spring 86 which surrounds the valve stem and is housed in a recess 87 of the valve body 71 serves to hold the valve in the position to which it is moved. Stop pins such as that shown at 88 may be secured in the valve body to limit the movement of the lever 85 in opposite directions.

Preferably air is used as the motive fluid, and to maintain pressure on the blocks 32 of a set of drivers an air storage tank 90 (Figs. 2 and 5) is provided. This is secured in any suitable manner at a convenient point on the face plate. It is connected with the lines to the cylinders 55 so that when the blocks 32 are moved to clamping position the tank will be filled and, when the blocks are released, the tank will be emptied.

Air can be supplied to the system from any suitable source. Preferably a ball check valve 100 is threaded into inlet duct 76 and for convenience a nipple 101 is secured in the inlet side of this check valve so that the air hose in the shop can quickly be attached to the nipple to provide the air supply. Valve 100 will be so constructed as to open on pressure and close when pressure is released.

Headers 92 (Figs. 2 and 5) serve to connect the lines 82 and 83 with the lines 102 and 103 that lead to opposite ends of the three cylinders 55 that are connected to three of the drivers of a set. A line 95 connects line 82 with one side of tank 90. A header 93 connects line 96, which communicates with the other side of the tank, with line 104 that leads to one side of the fourth cylinder 55 of the set. This header also serves to connect the duct 105, that leads to the opposite side of this cylinder, with duct 83.

The lathe may be provided with a power-operated hoist for lowering the work into chucking position and for lifting it out of the machine after the operations on the work are completed. Such a hoist is shown in Fig. 1. It comprises a trolley 105 which is supported by wheels 106 from a track 107, that, in turn, is supported from the machine by a post 108 and a post 109 and roller 110. The trolley carries the motor hoist 112 and crossbar 113. The crossbar carries the two hooks 115 which are connected to the crossbar by adjustable turnbuckles 116. A rod 118 holds the hooks 115 in spaced relation. The axle A of the work is suspended in the hooks 115 and so the work may be lowered into or raised out of working position.

When the work is in working position, the operator brings the work heads 11 into operative position and advances the centers of the lathe to center the work and hold it. The movement of the work heads brings the teeth 62 and 61 of the blocks 32 and 31 of the several drivers into engagement with the sides of the car wheels W. The operator may then attach the air supply hose to nipple 101 and move valve lever 85 to connect duct 72 with inlet duct 76 through hole 80. This will put line 82 on supply and the compressed air will be supplied to one side of three pistons 45 of the set of drivers of the face plate through headers 92 and ducts 102 while tank 90 is being filled with compressed air through duct 95 and while compressed air is being supplied to one side of the fourth piston 45 of the set through duct 96, header 93 and duct 104. The opposite side of this fourth piston is simultaneously connected with exhaust through duct 105, header 93 and line 83, while the ducts 103 and headers 92 are connecting the other three cylinders 55 with line 83. Line 83 is on exhaust through duct 73, recess 79 in valve head 78 and duct 74. Duct 74 may simply open into the air.

With the control valve 70 in the described position, the pistons 45 swing the eccentric blocks 32 of the four drivers of the set into engagement with the outside face of the adjacent wheel W. This will cause the teeth 62 of all the blocks 32 of the set of drivers to simultaneously bite into the face of the car wheel, and will cause the teeth 61 of all the blocks 31 of the set to bite into the face of the wheel also, because of the tendency of movement of any block 32 to cause pivotal movement of its lever 30. The several drivers of a set will grip the work simultaneously then and their gripping action will be equalized by the pressure fluid. Hence, with the present invention the work will be held squarely and with all the drivers taking their proper shares of the load.

The operator may engage one set of drivers by manipulating the valve 70 which controls that set, and may then engage the set of drivers carried by the other face-plate by manipulating the valve 70 which controls the other set; or he may engage both sets of drivers simultaneously with the outside surfaces of both wheels W of an axle by moving the levers 85 of both control valves 70 simultaneously.

When the drivers are engaged with the work, the lathe may be started. Cutting pressure of the tools on the work will serve to engage the drivers only the more securely since cutting pressure will only serve to move each block 32 counterclockwise about its axis in the direction of arrow $x$ (Fig. 4), and this will swing correspond lever 30 causing associated block 31 to adjust itself angularly and bite the more firmly into the work. When the drivers have been engaged with the work, the air supply hose is, of course, detached from nipple 101. During operation of the lathe, the compressed air in tank 90 serves to hold blocks 32 in engaged position under pressure through the pressure exerted on pistons 45. This increases the efficiency and effectiveness of the gripping action of the drivers.

When the lathe operation has been completed, the operator moves the two valve levers 85 to released position, putting the left hand ends of the several cylinders 55 (Fig. 5) on exhaust through ducts 104, 96 and 95, and ducts 102, line 82, duct 72, recess 79 of valve head 79 and outlet 74 (Figs. 6 to 8), and putting the right hand ends of these several cylinders on supply from the outside supply line through nipple 101, check valve 100, duct 76, hole 80, duct 73, and lines 83, 103 and 105. Simultaneously the tank 90 is emptied. The several blocks 32 are thus moved to released position. The work heads and centers can then be moved back and the completed work can be taken off the machine.

With the mechanism of the present invention, then, movement of the drivers to or from engaging position is a simple operation and all can be engaged or released simultaneously.

While a specific embodiment of the invention has been described, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A work-driving mechanism for a lathe comprising a plurality of supports adapted to be secured to the face-plate of a lathe in angularly spaced relation about the axis of the face-plate, a driver mounted on each support, each driver comprising a lever which is pivoted between its ends to the support to swing about an axis perpendicular to the axis of the face-plate, and a pair of blocks which are mounted in opposite ends of the lever, respectively, for rocking movement about axes extending in the general direction of the axis of the lever, each of said blocks having a surface adapted to engage a face of the work, the engaging surface of one block being eccentric of its rocking axis, and means for simultaneously rocking all said eccentric blocks in corresponding directions comprising a cylinder secured to each lever, a piston reciprocable therein, means connecting each piston to the associated eccentric block to move said block on movement of the piston and means for applying fluid pressure simultaneously to corresponding sides of the several pistons.

2. A work-driving mechanism for a lathe comprising a plurality of supports adapted to be secured to the face plate of a lathe in angularly spaced relation about the axis of the face-plate, a driver mounted on each support, each driver comprising a lever which is pivoted between its ends to the support to swing about an axis perpendicular to the axis of the face-plate, and a pair of blocks which are mounted in opposite ends of the lever, respectively, for rocking movement about axes extending in the general direction of the axis of the lever, each of said blocks having a surface adapted to engage a face of the work, the engaging surface of one block being eccentric of its rocking axis, means for simultaneously rocking all said eccentric blocks in corresponding directions comprising a cylinder secured to each lever, a piston reciprocable therein, means connecting each piston to the associated eccentric block to move said block on movement of the piston and means for applying fluid pressure simultaneously to corresponding sides of the several pistons, and means for constantly urging the several eccentric blocks about their axes in work engaging direction comprising a compressed air tank and ducts connecting said tank with the corresponding side of each and all the pistons.

3. A work-driving mechanism for a lathe comprising a plurality of supports adapted to be secured to the face-plate of a lathe in angularly spaced relation about the axis of the face-plate, a driver mounted on each support, each driver comprising a lever which is pivoted between its ends to the support to swing about an axis perpendicular to the axis of the face-plate, and a pair of blocks which are mounted in opposite ends of the lever, respectively, for rocking movement about axes extending in the general direction of the axis of the lever, each of said blocks having a surface adapted to engage a face of the work, the engaging surface of one block being eccentric of its rocking axis, means for simultaneously rocking all said eccentric blocks in corresponding directions comprising a cylinder secured to each lever, a piston reciprocable therein, means connecting each piston to the associated eccentric block to move said block on movement of the piston and means for applying fluid pressure simultaneously to corresponding sides of the several pistons comprising a single control valve, ducts connecting opposite sides of the pistons in parallel with the control valve, and an air tank connected with one of said ducts to be filled when the pistons are moved in the direction to rock the eccentric blocks into work-engaging position and to be emptied when the pistons are moved in the opposite direction, said control valve being constructed on manipulation to reverse the direction of flow of compressed air to the ducts.

4. A work-driving mechanism for a lathe comprising a plurality of supports secured to the face-plate of the lathe in angularly spaced relation about the axis of the face-plate, a pair of work-engaging members carried by each support, one of which is movable in the direction of rotation of the face-plate, means operatively connecting the two work-engaging members of a pair together so that movement of the work under the load of the cut will move the said one member of the pair in such direction as to increase the gripping force applied to the work by the other member, a cylinder associated with each of the first-named members of all the supports, a piston reciprocable in each cylinder, means operatively connecting each piston to the associated first member to move the first member on movement of the piston, means connecting the several cylinders so that pneumatic pressure may be applied simultaneously to corresponding sides of the several cylinders, means controlling the direction of application of pneumatic pressure to the cylinders, and an air-tank connected to the pneumatic pressure system in such way as to be filled when the air pressure is so applied to the pistons as to move the first-named members to work-engaging position and to be emptied on movement of the pistons in the opposite direction, said air tank serving to supply air under pressure to the cylinders during cutting tending to move the work-engaging members in the direction in which increased gripping force will be applied to the work.

ROLAND R. ROBERTS.

REFERENCES CITED

The following references are of record in the file of this patent:

UNITED STATES PATENTS

| Number | Name | Date |
|---|---|---|
| 881,373 | Burt | Mar. 10, 1908 |
| 1,424,754 | Cullen | Aug. 8, 1922 |